Figure 1:
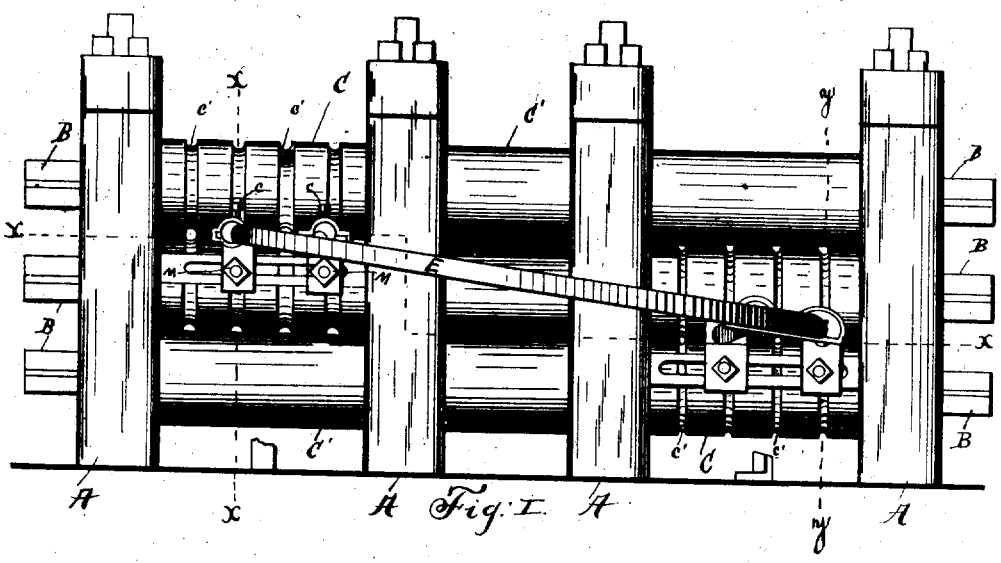

3 Sheets—Sheet 1.

W. F. THOMPSON.

Assignor of one-half to J. WALKER.

WIRE ROD ROLLING MILL.

No. 11,172. Reissued June 23, 1891.

WITNESSES:
Victor Schneider
Albert B. Blackwood

INVENTOR.
William F. Thompson
by H. T. Fisher
ATTORNEY.

W. F. THOMPSON.

Assignor of one-half to J. WALKER.

WIRE ROD ROLLING MILL.

No. 11,172. Reissued June 23, 1891.

WITNESSES:

Victor Schneider

Albert B. Blackwood

INVENTOR.

William F. Thompson by H. T. Fisher

ATTORNEY.

3 Sheets—Sheet 3.
W. F. THOMPSON.
Assignor of one-half to J. WALKER.
WIRE ROD ROLLING MILL.
No. 11,172. Reissued June 23, 1891.
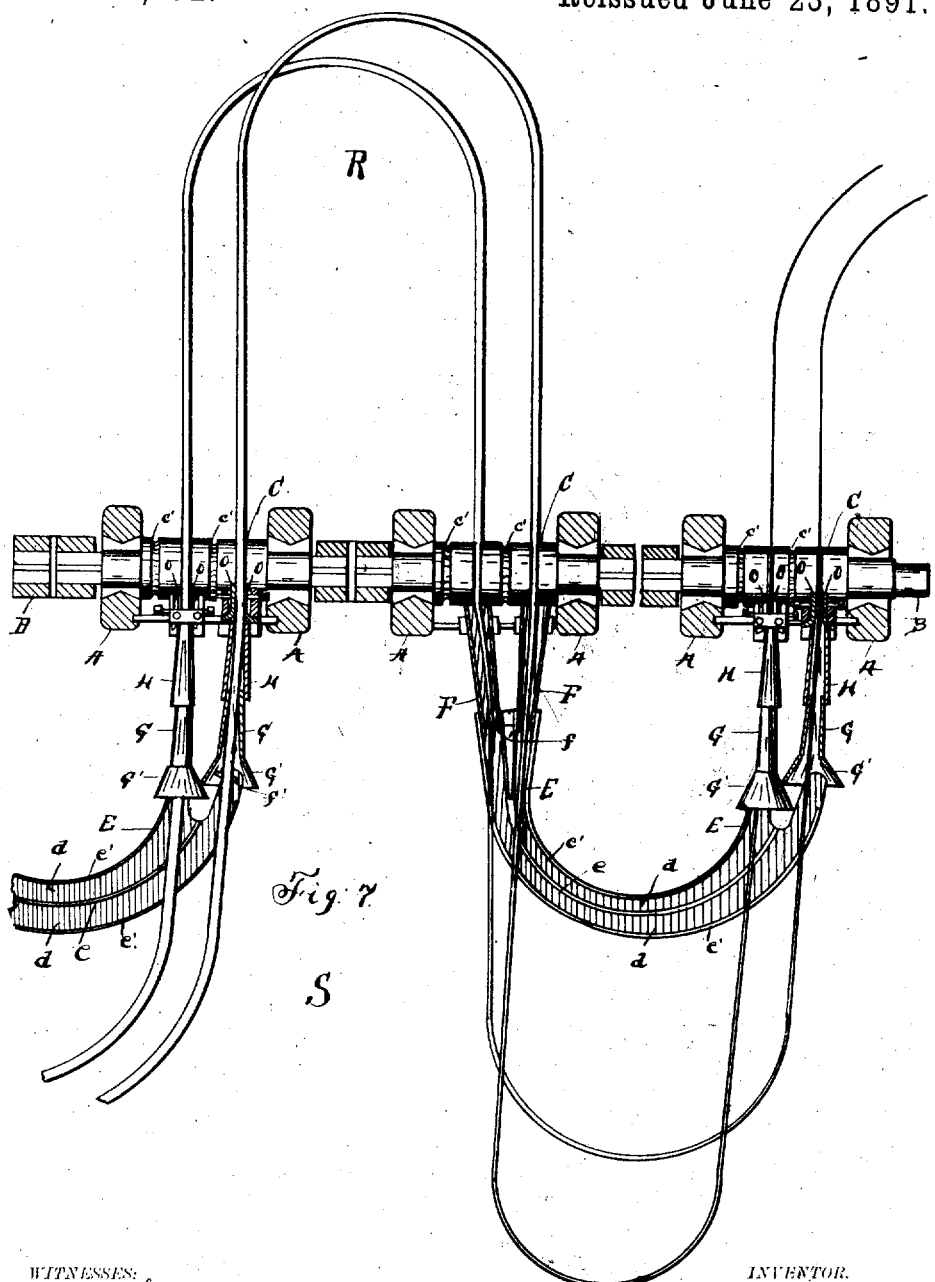
WITNESSES:
Victor Schneider
Albert B. Blackwood
INVENTOR.
William F. Thompson
By H. T. Fisher
ATTORNEY.

UNITED STATES PATENT OFFICE.

WILLIAM F. THOMPSON, OF CLEVELAND, OHIO, ASSIGNOR OF ONE-HALF TO JOHN WALKER, OF SAME PLACE.

WIRE-ROD-ROLLING MILL.

SPECIFICATION forming part of Reissued Letters Patent No. 11,172, dated June 23, 1891.

Original No. 391,664, dated October 23, 1888. Application for reissue filed March 25, 1891. Serial No. 386,404.

*To all whom it may concern:*

Be it known that I, WILLIAM F. THOMPSON, of Cleveland, in the county of Cuyahoga and State of Ohio, have invented a certain new and Improved Duplex Conductor for Use in Combination with Wire-Rod Mills; and I do hereby decl e that the following is a full, clear, and complete description thereof.

My invention relates to improvements in conductors for wire-rod mills, and the object of the invention is to economize help, to reduce waste by scrap, and to increase the capacity of mills as they are now established, all as hereinafter more fully described.

Hitherto in this art, so far as I am aware, it has been the universal practice to employ a single conductor or guide for the material from one set of rolls to the other at the rear thereof. My improvement comprises two or more of such conductors or guides, and the nature and use of this improvement will appear from a statement of the practice on which the improvement is made. Primarily the material is in the form of a billet, say two feet in length and four inches in thickness, and heated to the proper degree for reduction to wire. To work this reduction the billet passes, first, through a train of roughing-rolls and then through a train of finishing-rolls, and the operation from one train of rolls to the other, and from one set of rolls to the other in the trains, is continuous. My improvement has to do more especially with the finishing-rolls. Obviously, the billet will pass instantly through the first set of rolls, and almost as quickly through the second set, being as yet but slightly reduced. Through the third set it will be as much longer in passing as it has been elongated, until, when it travels to the first of the series of finishing-rolls, it has sustained considerable reduction and acquired considerable length. Here the process of gradual reduction is continued from set to set of rolls in the train, the conductors governing the return of the material at the rear of the rolls and the men with tongs feeding it back at the front, one man for each bench or stand of rolls; but in the progress of the material through the rolls it becomes reduced to very great length—say a hundred times greater than the length of the billet—and this necessitates much more time for it to feed through the last of the train of finishing-rolls than it required to pass through the initial roughing-rolls. The difference between these times represented the length of time the roughing-rolls and the men employed with them were idle, because it would not do to start a new change of material until the preceding one was sufficiently out of the way, as that would necessarily make scrap of the overfeed, whatever it might be. The feed-men along the finishing-train likewise were idle while the full length of the single strand of wire was feeding through their respective rolls, and the sum total of this idleness was considerably in excess of the time employed. The difference in time and speed was in part made up by the greater speed of the finishing-rolls; but this fell far short of obviating the loss of much valuable time. To obviate this loss as nearly as possible, and to increase the output of the mill without making any increase whatever in the number of men or number or character of rolls employed is the object of my invention, and this is accomplished by providing for the handling of two or more separate and distinct lines of material through the same rolls, and by the aid of the same men at the same time instead of only a single line or run, as heretofore. This is accomplished by providing two or more conductors or guides for the material at the rear of the rolls, so that two or more strands of material or wire can be fed through at the same time, and each have a distinct guideway from the other, and be adapted to work as freely from the other as if a single line alone were being rolled. The use of two conductors with a double feed doubles the capacity of the mill without added expense on any account and with the same force, and the use of three conductors trebles the capacity or output without additional expense or help. A fourth line of material with four conductors could be operated with a like increase in the output without changing the construction of the rolls or increasing the working force attending them.

Figure 2:
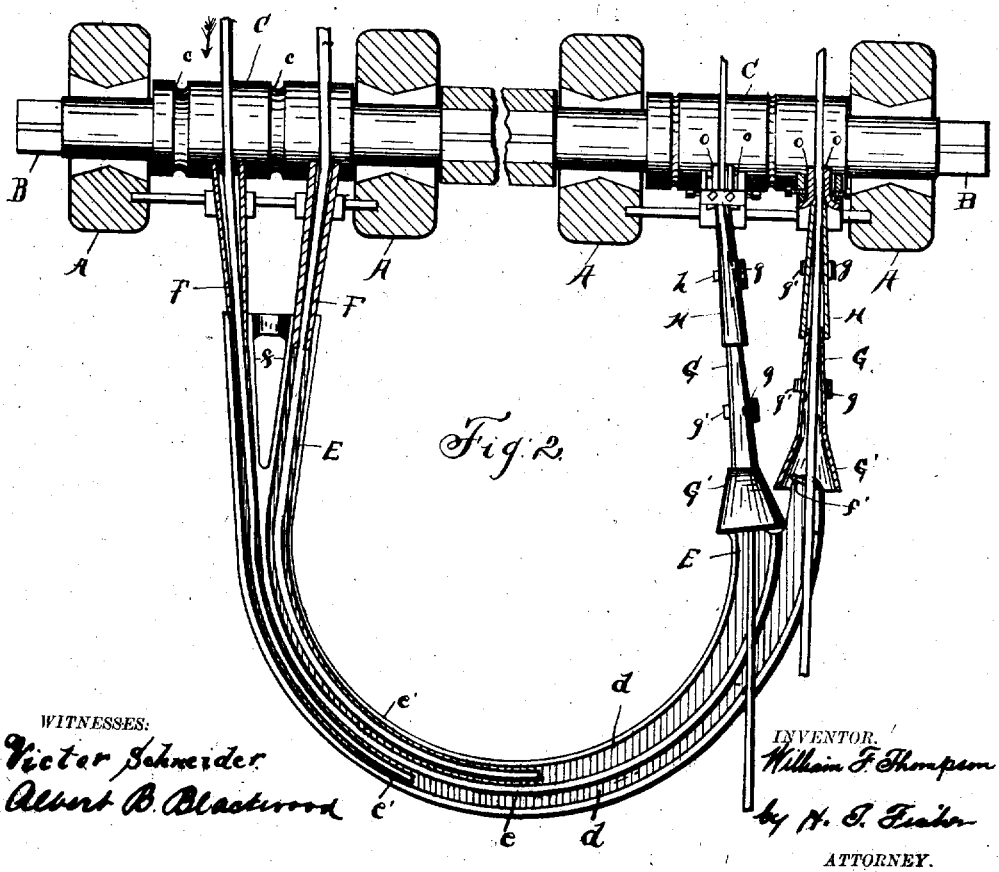
Figure 3:
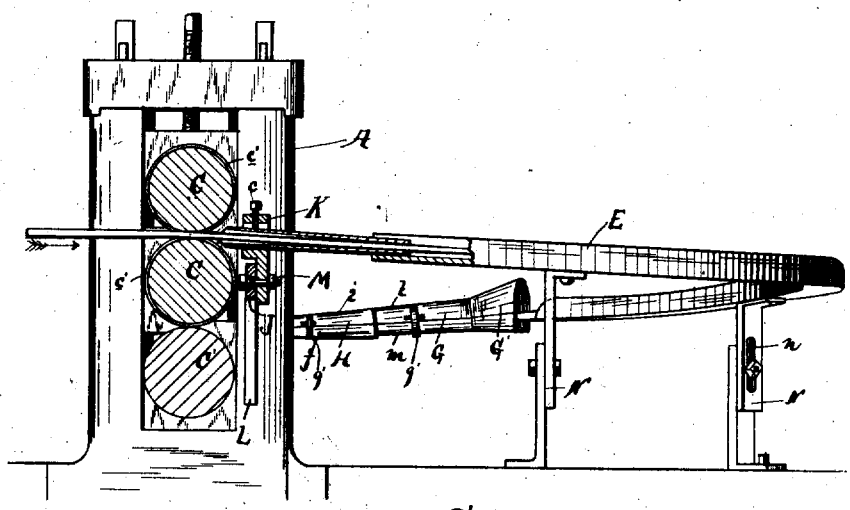
Figure 4:
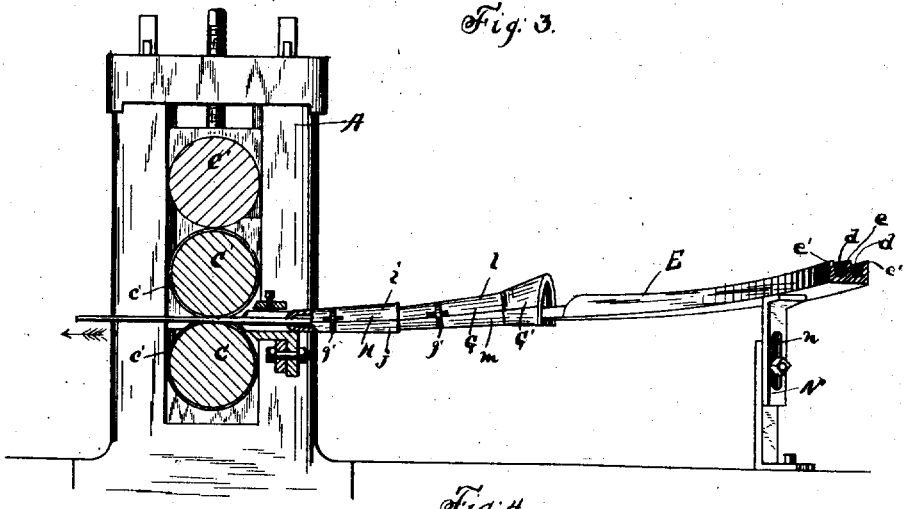
Figure 5:
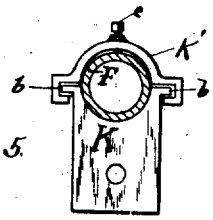
Figure 6:
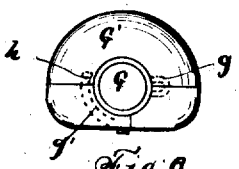

In the accompanying drawings, Figure 1 is a rear elevation of a set of rolls with which two conductors or guideways are employed, and Fig. 2 is a horizontal section on line $x\ x$, Fig. 1, and a plan view of the conductors or guides with a part thereof in section horizontally. Fig. 3 is a cross-section on line $x'$ $x'$, Fig. 1, and Fig. 4 is a cross-section substantially on line $y\ y$, Fig. 1. Fig. 5 is an enlarged face view of a detached section of a fastening mechanism for one of the conductors and a cross-section of the conductor, and Fig. 6 is an outer end view of one of the inner sections of the conductors on the return or rear side thereof. Fig. 7 is a plan view of a series of finishing-rolls and of parts of the field or platform on either side over which the wire loops spread during the operation of rolling, all as hereinafter more fully described.

In Figs. 1 and 2 are represented what may be termed a "bench of rolls" set in suitable frame-work A and constituting one bench or a double set of rolls in a train of finishing-rolls of like construction and equipment and driven by any suitable power connection, (not shown,) power being transmitted from one set of rolls to the other in the bench and in the train by suitable connection at the abutting spindles B of the several rolls. No novelty is claimed for this connecting mechanism and it is well known in the art. The arrangement of two grooved rolls C and a dummy or blank roll C′, as here shown, likewise is old and well known. Each bench of rolls is provided with grooved or channeled conductors or guides E at its rear for conveying the material that is fed by hand into one set of rolls back through the other set. The direction of feed is indicated by arrows, and as the rolls revolve very rapidly an end of material is no sooner fed into one set than it flies out through the other set, being guided by the conductor from one to the other. The instant it is thrust through the return set of rolls the end is caught by the tongs of the operator standing at that point and whipped back through the next adjoining set of rolls, Fig. 7, and so on to the end of the train, the flying end of the material or wire threading itself with great rapidity first through one set of rolls and then through the other until the end is reached; but the size of the groove $c$ in the rolls C of the succeeding sets of rolls gradually diminishes, so that the material is crowded back from the rolls under the process of reduction, and hence forms a gradually increasing loop between any two sets of rolls—as shown, for example, in Fig. 7—as long as the ends of the material are held in said sets, as shown in said figure. This occurs because the material is fed through the first set faster than it can issue reduced through the second set. For this reason the conductor serves merely as an initial guide for the material and to convey the leading end automatically from one set of rolls into the other. This done the loop of the material instantly begins to enlarge and is forced out of the conductor upon the floor beneath, where it is free to expand as much as may be necessary. A corresponding loop will of course form on the front side of the rolls between the respective benches, and the more finely drawn the material becomes the larger the loop will be until it reaches a depth of a hundred feet or more.

The central part of the conductors, as here shown, consists of the part E, provided with two separate and distinct channels $d$, formed by a rib $e$ at the center and flanges $e'$ at either side, and the said part E is open on top, so as to allow the material to spring out of the channels and accommodate itself to the operation of the rolls, as hereinbefore described. At the initial end of part E the rib $e$ runs into a double-walled partition $f$, serving a like purpose, as $e$, but adapted to the spreading end of said part, where separate pipe or tubular connections F complete the conductor and receive the material from the corresponding grooves in the roll. At the opposite or return side of the part E a double set of guide pipes G and H complete the connection from each guide-channel to the rolls. The pipes G have flaring mouths G′, so as to more certainly catch the approaching end of the material as it flies around through the channel, and the pipe G is shown as being slightly telescoped in pipe H. The return end of part E is bifurcated for the attachment of parts G, and each part G has a slot $f'$ for a locking connection with the bifurcated extremity of E, and by which it may be laterally adjusted thereto. The pipes G are formed in halves $l$ and $m$ longitudinally and horizontally, and the pipes H are formed similarly of halves $i$ and $j'$, each of which set of halves have hinges $g$, a spring-catch $g'$, and a lug $h$, on which the catch $g'$ locks. This construction makes it convenient to open either pipe or set of pipes in case obstruction occurs from tangling of material or wire therein. The sectional construction G and H is employed, because the pipe nearest the rolls will wear out more quickly than the part farther back, and this allows the worn part above to be replaced by a new pipe, thus saving the expense of making all new.

In the uprights of the frame-work or housing A are vertical grooves I, in which are transversely arranged slotted bars J, adjustably held in said slots to fix the elevation of the guides. The guide-holders K are laterally adjustable in bars J, in which they are held by bolts M, whereby alignment is made between the grooves in the rollers and the guides. The holders K have lateral lugs $b$ at their top, which are engaged by overlapping edges $k$ of the cover K′, which secures the pipe F to the holder K, as clearly seen in Fig. 5. A set-screw $c$ through the top of cover K′ holds pipe F securely in position. The pipe F gradually tapers from its mouth at the rolls to its opposite end, so as to more surely guide the material to and through the center of the curved guiding or conducting-channel beyond. The part F is supported on sectional standards N, having slots *n*, by which they are adjustable, so as to give the proper elevation to the said part F. At the inner ends of pipes H are guide-lines O, to direct the ends of the wire into the grooves in the rolls, and these parts O are held in place by set-screws.

It will be seen in Fig. 7 that the strands or loops of wire may overlay or overlap one another on the fields R and S with perfect safety and without danger of becoming entangled on that account. Each loop continues to expand until the end of the wire is released from the preceding rolls, and then the wire is drawn through the reducing-rolls with a free end.

It is expected that one strand of wire will quickly follow another, so as to avoid loss of time between them; but if one is started through the roughing-rolls, so as to overtake and overlap the tine of the other in the finishing-rolls the latter will become waste or scrap by as much as it is ahead of time. This can be avoided by having an extra conductor, over and above what is regularly used, to take care of the overfeed, and thus scrapping on this account may be wholly avoided.

A set of rolls as herein described is understood to mean a series of three rolls, one above the other, and a double set or bench of rolls comprises two sets. The conductors are arranged from one set to another, as seen in Figs. 1 and 2, and the channels of the curved intermediate section or repeater are semicircular, so as to guide the end of the wire centrally therein and to enable the wire to climb over the wall of the channel after the end enters the return-rolls and the loop forms and enlarges, as herein described. The connecting ends of the conductor are tubular, so as to better answer the purpose of guides. The entire conductor is substantially in the shape of the letter U, and by the term "conductor" is meant that construction which guides a single wire from one set of rolls to another. In the drawings two conductors are shown, the central portion of which is made in a single piece with a partition between the different conducting-channels. The result would be the same if the two channels were formed from or in different and separate parts. In operation each conductor is entirely independent of the other.

The described mechanism of the conductors and attachments in connection with the rolls may be so enlarged and arranged as to lead and conduct more than two rods simultaneously from one set of rolls to the following reducing-rolls in essentially the same way as the transit of two rods from the rolls C of one set to and through the rolls C of the other set, before set forth.

Having thus described my invention, what I claim as new, and desire to secure by Letters Patent, is—

1. In a wire-rolling mill, two sets of rolls provided each with a series of grooves, and a set of curved conductors extending from one set of rolls to the other, and each conductor matching with different grooves in said rolls, whereby two or more strands of wire may be passed simultaneously through the same rolls, substantially as described.

2. The combination, with a rolling-mill, of a curved conducting section or part having separate channels side by side, and separate end sections connecting with each of said channels and extending to the rolls, substantially as described.

3. The combination, with a rolling-mill, of a curved repeater formed of the channel-sections set side by side, and a funnel-shaped guide, substantially as described.

4. The guide-pipes G and H, arranged in sections and separable longitudinally, in combination with the curved conductor E, provided with channels, and the rolls to which said parts form guides for the wire, substantially as described.

5. The combination of sets of wire-rod rolls, the conductors consisting of guide-pipes F at one end, the guide-pipes G and H at the other end, and the intermediate curved channels completing the circuit of said conductors, the pipes G having flaring mouths at their junction with the extremities of the intermediate conducting-channels and removable top portions, substantially as described.

WILLIAM F. THOMPSON.

Witnesses:
H. T. FISHER,
NELLIE L. MCLANE.